United States Patent [19]

Makino et al.

[11] Patent Number: 4,773,614
[45] Date of Patent: Sep. 27, 1988

[54] TAPE CASSETTE

[75] Inventors: Masahiro Makino; Yuji Iwahashi, both of Miyagi, Japan

[73] Assignee: Sony Corporation, Tokyo, Japan

[21] Appl. No.: 2,206

[22] Filed: Jan. 12, 1987

[30] Foreign Application Priority Data

Feb. 4, 1986 [JP] Japan .............................. 61-14763[U]

[51] Int. Cl.⁴ .............................................. G03B 1/04
[52] U.S. Cl. .................................................... 242/199
[58] Field of Search ................ 242/197, 199, 55.19 A; 206/387, 459; 360/132

[56] References Cited

U.S. PATENT DOCUMENTS

| | | | |
|---|---|---|---|
| 3,565,367 | 2/1971 | Yamamoto | 242/199 |
| 3,704,841 | 12/1972 | Brown | 242/199 |
| 3,873,045 | 3/1975 | Nemoto | 242/199 |
| 4,063,370 | 12/1977 | Saito | 206/459 X |
| 4,501,359 | 2/1985 | Yoshizawa | 206/387 |
| 4,501,396 | 2/1985 | Tomsyck et al. | 206/459 X |
| 4,566,653 | 1/1986 | Bettinger et al. | 242/199 |
| 4,646,916 | 3/1987 | Ishida | 206/387 |

Primary Examiner—John Petrakes
Assistant Examiner—Katherine Matecki
Attorney, Agent, or Firm—Ronald P. Kananen

[57] ABSTRACT

A tape cassette comprising upper and lower halves secured to each other to define a space containing a pair of tape reels. The upper half is formed in its upper surface with a depression. The upper half is provided with a window opening above one of the tape reels. A transparent window plate is provided on the upper half. The window plate is made through a molding process using a gate to spout a fused transparent synthetic resin into a molding cavity. The transparent window plate has a first portion covering the window opening and a second portion extending a substantial length from the first portion over the depression. The window plate second portion has a gate mark made thereon after the molding process. The gate mark is hidden under a label stuck on the depression.

2 Claims, 3 Drawing Sheets

TAPE CASSETTE

BACKGROUND OF THE INVENTION

This invention relates to a tape cassette including upper and lower halves secured to each other to define a space for receipt of a pair of tape reels and, more particularly, to a tape cassette having a window opening provided in the upper half above one of the tape reels and a transparent window plate covering the window opening, the window plate being produced through a molding process using a gate for spouting a fused synthetic resin into a molding cavity.

Generally, tape cassettes include upper and lower halves secured to each other to define a space containing a pair of tape reels. In order to provide a visual indication of rotation of the tape reels, the upper half has a semicircular window opening above one of the tape reels, the window opening being covered with a transparent window plate having a semicircular shape conforming to the window opening. It is normal practice to produce such a transparent window plate through a molding process using a gate through which a fused synthetic resin is spouted into a molding cavity. Through such a molding process, however, a gate mark is made on the produced window plate near its center, degrading the appearance. Another disadvantage with conventional tape cassettes is that some technique is required in molding a semicircular window plate having acute-angled corners made by the arc and chord of the semicircular window plate. In addition, a great stress concentration occurs at the acute-angled corners during the molding process, reducing the service life of the produced window plate.

SUMMARY OF THE INVENTION

It is a main object of the invention to provide a tape cassette which exhibits a good appearance.

Another object of the invention is to provide a tape cassette having a transparent window plate which is simple, durable, and easily produced.

There is provided, in accordance with the invention, a tape cassette comprising upper and lower halves secured to each other to define a space containing a pair of tape reels. The upper half is formed in its upper surface with a depression. The upper half is provided with a window opening above one of the tape reels. A transparent window plate is provided on the upper half. The window plate is made through a molding process using a gate to spout a fused transparent synthetic resin into a molding cavity. The transparent window plate has a first portion covering the window opening and a second portion extending a substantial length from the first portion over the depression. The window plate second portion has a gate mark made thereon after the molding process. The gate mark is hidden under a label stuck on the depression.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

DETAILED DESCRIPTION OF THE PREFERRED EMBODIMENT

Figure 1:
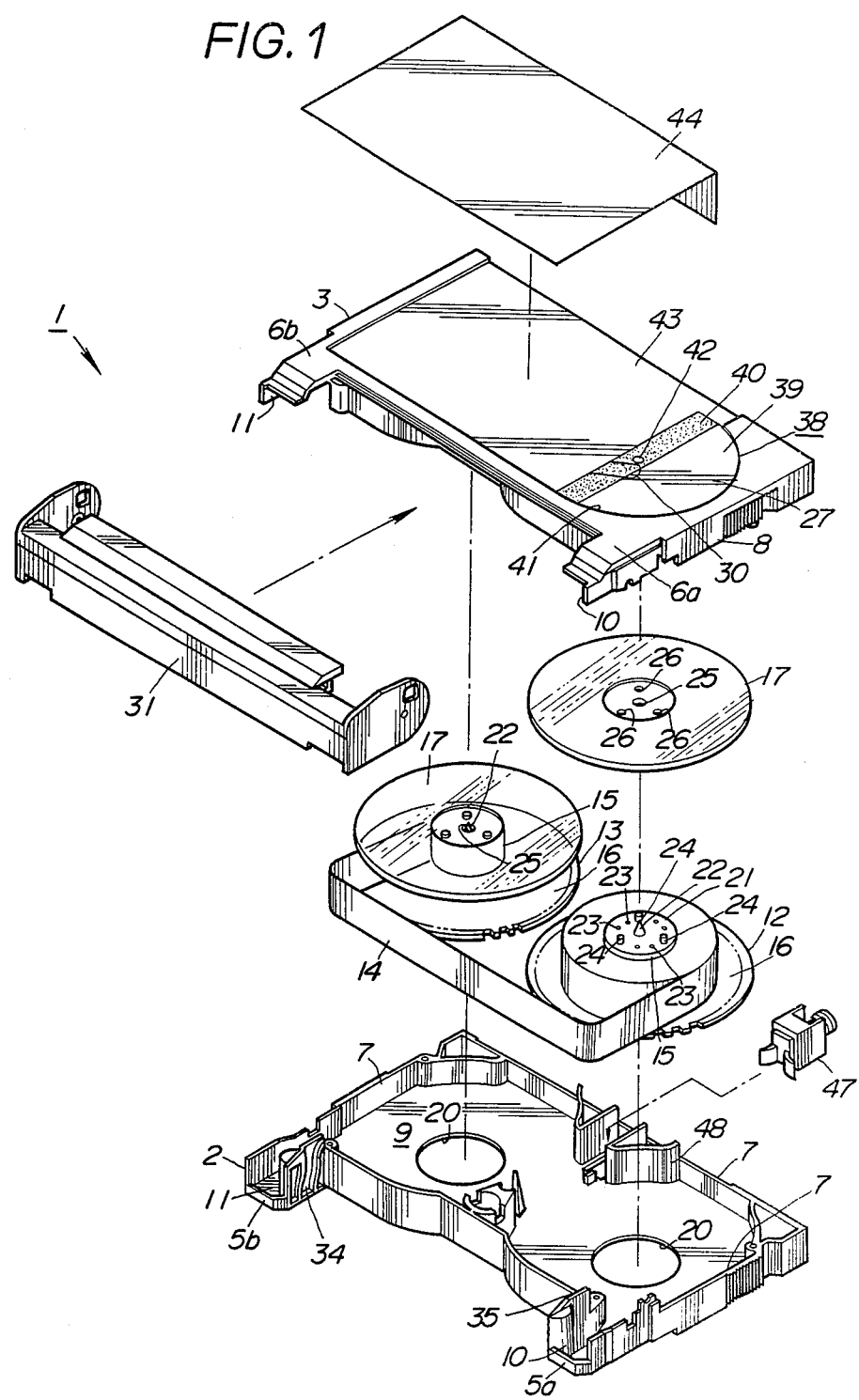
FIG. 1 is an exploded perspective view showing one embodiment of a tape cassette made in accordance with the invention.

With reference to the drawings, wherein like reference numerals refer to like parts in the several views, there is shown one embodiment of a tape cassette made in accordance with the invention. Although the invention will be described in connection with a small-sized tape cassette for use with so-called 8 mm video tape recorders or players, it is to be noted that the invention is not limited in any way to such a tape cassette.

Referring to FIG. 1, the tape cassette, designated generally by the numeral 1, includes a casing 4 which comprises lower and upper halves 2 and 3. The lower half 2 has a surrounding wall 7 with left and right protruding portions 5a and 5b near the opposite sides of the front face thereof. The upper half 3 has a surrounding wall 8 with left and right protruding portions 6a and 6b near the opposite sides of the front face thereof. The lower and upper halves 2 and 3 are fastened to each other in a manner to define a space 9 for receipt of a pair of tape reels 12 and 13 along with right and left protruding tape guides 10 and 11.

The tape reel 12, which is referred to as a supply reel, is made from a synthetic-resin formed as a one-piece member having a cylindrical hollow hub 15 and lower and upper flanges 16 and 17 secured in a parallel-spaced relation on the circumferential surface of the reel hub 15 near its opposite ends. The supply reel 12 carries a magnetic tape 14 would around the reel hub 15 between the lower and upper reel flanges 16 and 17. The reel hub 15 has its top end closed by an opaque top plate 21 secured on the upper end thereof. The top plate 21 has a center projection 22 formed at the center thereof and a plurality of equally spaced circumferential projections 24 arranged circumferentially about the center projection 22. The upper flange 17 is formed with a center hole 25 and a plurality of circumferential holes 26 at positions corresponding to the circumferential projections 24. The upper flange 17 is secured by suitable techniques, such as bonding, fusing, or the like, on the top plate 21. The center projection 22 extends through the center hole 25 and the respective circumferential projections 24 extend through the circumferential holes 26 to provide the accuracy required in positioning the upper flange 17 on the top plate 21. The supply reel 12 is positioned for rotation within the tape receipt space 9 with its reel hub 15 being in loose engagement with a circular opening 20 formed in the bottom surface of the casing 4. The reel hub 15 is formed in its bottom surface with a hole (not shown) for engagement with a reel shaft when the tape cassette 1 is placed in position on a tape recorder or player.

Similarly, the tape reel 13, which is referred to as a take-up reel, is made from a synthetic-resin formed as a one-piece member having a cylindrical hub 15 and lower and upper flanges 16 and 17 secured in a parallel-spaced relation on the circumferential surface of the reel hub 15 near its opposite ends. The take-up reel 13 carries the magnetic tape 14 taken from the supply reel 12 and wound around the reel hub 15 between the lower and upper reel flanges 16 and 17. The reel hub 15 has a top plate 21 secured on the upper end thereof. The top plate 21 has a center projection 22 formed at the center thereof and a plurality of equally spaced circumferential projections 24 arranged circumferentially about the center projection 22. The upper flange 17 is formed with a center hole 25 and a plurality of circumferential holes 26 at positions corresponding to the circumferential projections 24. The upper flange 17 is secured by suitable techniques, such as bonding, fusing, or the like, on the top plate 21. The center projection 22 extends through the center hole 25 and the circumferential projections 24 extend through the respective circumferential holes 26 to ensure accurate positioning of the upper flange 17 with respect to the top plate 15. The take-up reel 13 is positioned for rotation within the tape receipt space 9 with its reel hub 15 being in loose engagement with another circular opening 20 formed in the bottom surface of the casing 4. The reel hub 15 is formed in its bottom surface with a hole (not shown) for engagement with another reel shaft when the tape cassette 1 is placed in position on the tape recorder or player.

The magnetic tape 14 extends from the supply reel 12 to the exterior through the right protruding tape guide 10 and hence through the left protruding tape guide 11 to the take-up reel 13. Therefore, the magnetic tape 14 has a portion placed outside the casing 4 between the right and left protruding tape guides 10 and 11.

In order to provide effective protection for the magnetic tape exposed portion, outer and inner tape covers 31 and 32 are provided. The outer tape cover 31 is pivoted at a pivot 31a on the opposite side surfaces of the upper half 3. The outer tape cover 31 is resiliently urged to its closed position covering the front side of the magnetic tape 14 between the right and left protruded tape guides 10 and 11. The outer tape cover 31 moves to its open position exposing the magnetic tape 14 automatically when the tape cassette 1 is placed in position on the tape recorder. The inner tape cover 32 is pivoted at 33 on the rear surface of the outer tape cover 31. The inner tape cover 32 has extensions 36 extending from the opposite ends thereof. The extensions 36 are in engagement with S-shaped guide grooves 34 and 35, respectively, which permit movement of the inner tape cover 32 with movement of the outer tape cover 31. When the outer tape cover 31 is at its closed position, the inner tape cover 32 is at its closed position covering the rear side of the magnetic tape 14. As the outer tape cover 31 moves toward its open position, the distance between the lower edges of the outer and inner tape covers 31 and 32 increases. When the outer tape cover 31 is at its open position, the inner tape cover 32 is at its open position exposing the rear side of the magnetic tape 14. It is, therefore, apparent that the outer and inner tape covers 31 and 32 close to cover the front and rear sides of the magnetic tape 14 except when the tape cassette 1 is placed in position on the tape recorder or player.

The numeral 47 designates a lock slider which is placed for sliding movement in a lock guide 48. The lock slider 47 is resiliently urged into a lock position where it is in engagement with the teeth formed circumferentially in the lower flanges of the supply and take-up reels 12 and 13. When the tape cassette 1 is placed in position on the tape recorder or player, the lock slider 47 moves to an unlocked position where it is out of engagement with the reel teeth to permit rotation of the supply and take-up reels 12 and 13.

Figure 2:
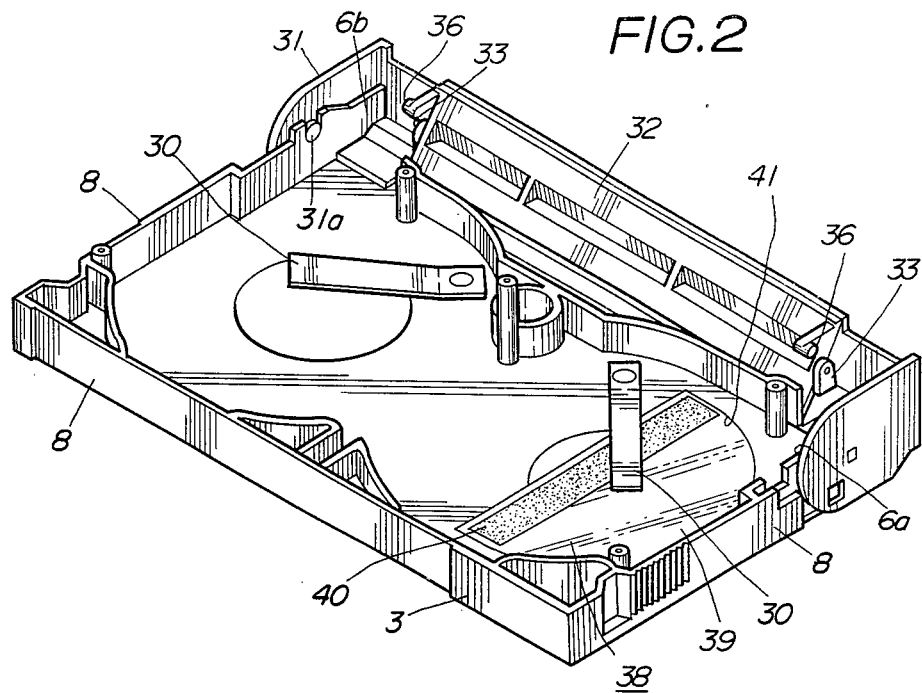
FIG. 2 is a perspective view of the upper half of the tape cassette.
Figure 5:
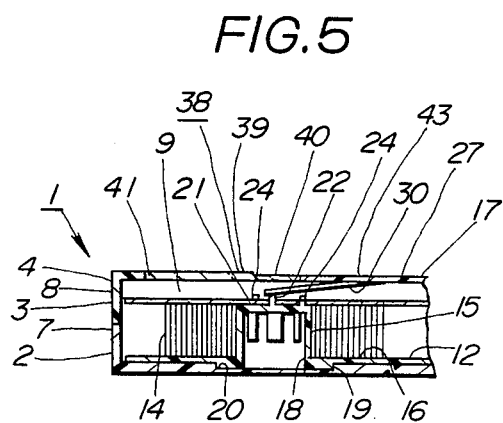
FIG. 5 is a fragmentary sectional view taken along the line V—V of FIG. 3.

Referring to FIG. 2, the reference numeral 30 designates a pair of leaf springs. The first leaf spring has an end secured on the rear surface of the upper half 3 and a free end placed in abutment on the center projection 22 to resiliently urge the supply reel 12 downward, as best shown in FIG. 5. Similarly, the second leaf spring has an end secured on the rear surface of the upper half 3 and a free end placed in abutment on the center projection 22 to resiliently urge the take-up reel 13 downward. These leaf springs 30 are effective to stabilize rotation of the tape reels 12 and 13.

Referring back to FIG. 1, the upper half 3 has a shallow depression 43 formed in the upper surface thereof for replacement of an index label 44. The supply reel 12 has a plurality of equally spaced small through-holes 23 formed in the top plate 21 circumferentially of the center projection 24. Therefore, a light beam, which is applied upward toward the bottom of the reel hub 15 when the tape cassette 1 is placed in position on the tape recorder, can pass through the small through-holes 23 to provide a light indication of rotation of the supply reel 12.

Figure 3:
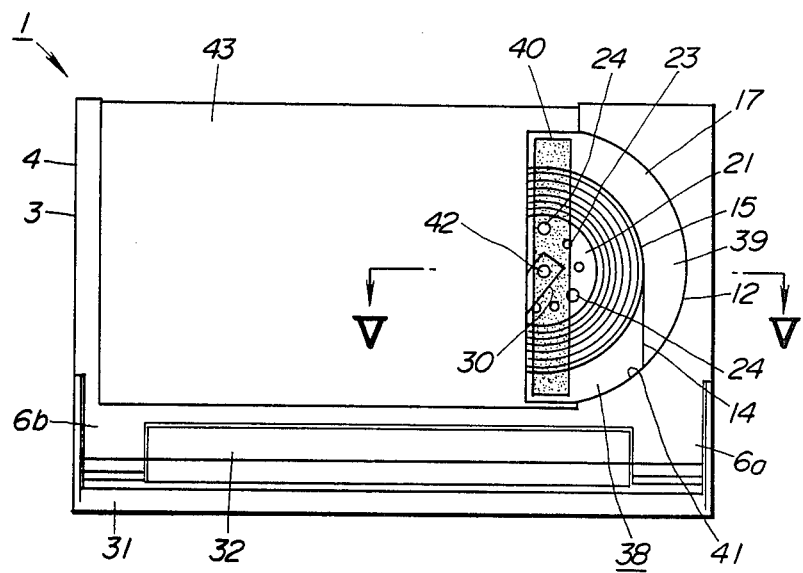
FIG. 3 is a plan view of the tape cassette with no label stuck on the depression.
Figure 4:
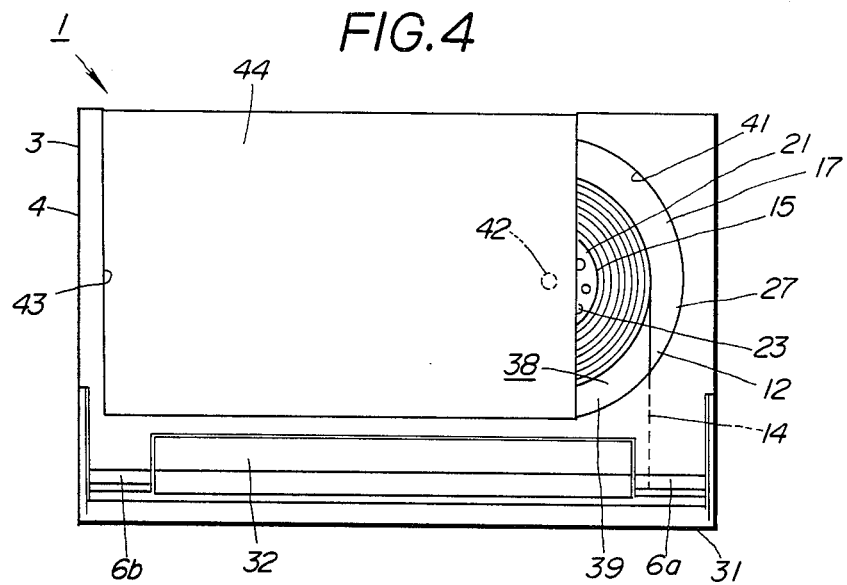
FIG. 4 is a plan view of the tape cassette with a label stuck on the depression.

For this purpose, the upper half 3 is provided with a semicircular window opening 41 through which the right half of the supply reel 12 can be viewed. The window opening 41 is covered with a transparent window plate 38 which has a semicircular portion 39 conforming to the window opening 41 and a rectangular portion 40 extending a substantial length over the depression 43. The window plate semicircular portion 39 is secured on the semicircular edge of the window opening 41 and the window plate rectangular portion 40 is secured on the depression 43. The window plate 38 may be secured on the upper half 3 by suitable techniques, such as dichromatic molding or bonding. The transparent window plate 38 is produced through a molding process using a gate through which a fused transparent synthetic resin is spouted into a molding cavity. Therefore, a gate mark 42 is made on the window plate 38 at a position corresponding to the position at which the gate has been placed. According to the invention, the window plate rectangular portion 40 extends over the depression 43 a substantial length allowing placement of the gate on the rectangular portion 40 so that the gate mark 42 is made on the window plate rectangular portion 40, as best shown in FIG. 3. Consequently, the gate mark is hidden under a label stuck on the depression, as best shown in FIG. 4, so as to improve the tape cassette. In addition, since the window plate 38 has no acute-angled corner, it is durable and easy produced. It is to be noted that the transparent window may have a bow shape somewhat smaller than a semicircular shape so as to permit the depression to hide the leaf spring 30. This is effective to further improve the tape cassette appearance.

While this invention has been described in conjunction with a specified embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A tape cassette comprising upper and lower halves secured to each other to define a space containing a pair of tape reels, said upper half having an upper surface, a depression formed in the upper surface of said upper half, a window opening provided in said upper half above one of said tape reels, a transparent window plate provided on said upper half, said window plate being made through a molding process using a gate to spout a fused transparent synthetic resin, said transparent window plate covering said window opening and having a first portion coplanar with the upper surface and a depressed portion extending from said first portion coplanar with said depression, said window plate depressed portion having a gate mark made by said molding process, and a label stuck on said depression and said depressed portion to hide said gate mark.

2. The tape cassette as claimed in claim 1, wherein said window opening has a substantially semicircular shape defined by an arc and a chord, said window plate first portion having a substantially semicircular shape, said window plate depressed portion having a rectangular shape extending from said chord.

* * * * *